US009010430B2

(12) United States Patent
Darby et al.

(10) Patent No.: US 9,010,430 B2
(45) Date of Patent: Apr. 21, 2015

(54) METHOD OF USING SHAPED COMPRESSED PELLETS IN TREATING A WELL

(75) Inventors: John Gregory Darby, Montgomery, TX (US); D. V. Satyanarayana Gupta, The Woodlands, TX (US); Dong Shen, Houston, TX (US)

(73) Assignee: Baker Hughes Incorporated, Houston, TX (US)

( * ) Notice: Subject to any disclaimer, the term of this patent is extended or adjusted under 35 U.S.C. 154(b) by 569 days.

(21) Appl. No.: 12/839,047

(22) Filed: Jul. 19, 2010

(65) Prior Publication Data

US 2012/0012326 A1 Jan. 19, 2012

(51) Int. Cl.
| | |
|---|---|
| E21B 37/06 | (2006.01) |
| C09K 8/52 | (2006.01) |
| C09K 8/524 | (2006.01) |
| C09K 8/536 | (2006.01) |

(52) U.S. Cl.
CPC .............. *C09K 8/524* (2013.01); *C09K 8/536* (2013.01); *E21B 37/06* (2013.01)

(58) Field of Classification Search
None
See application file for complete search history.

(56) References Cited

U.S. PATENT DOCUMENTS

| | | | |
|---|---|---|---|
| 1,570,537 A | 1/1926 | Teitsworth | |
| 3,179,170 A | 4/1965 | Burtch et al. | |
| 3,850,248 A | 11/1974 | Carney | |
| 4,108,779 A | 8/1978 | Carney | |
| 4,109,721 A | 8/1978 | Slusser | |
| 4,352,741 A | 10/1982 | Wernau | |
| 4,552,591 A | 11/1985 | Millar | |
| 4,660,645 A | 4/1987 | Newlove et al. | |
| 4,738,897 A | 4/1988 | McDougall et al. | |
| 4,905,762 A | 3/1990 | Zilch | |
| 4,986,353 A | 1/1991 | Clark et al. | |
| 5,073,276 A | 12/1991 | Newlove et al. | |
| 5,102,558 A | 4/1992 | McDougall et al. | |
| 5,187,011 A | 2/1993 | Manalastas et al. | |
| 5,224,543 A | 7/1993 | Watkins et al. | |
| 5,225,123 A | 7/1993 | Torobin | |
| 5,741,758 A | 4/1998 | Pakulski | |
| 5,758,725 A | 6/1998 | Streetman | |
| 5,893,416 A | 4/1999 | Read | |
| 5,922,652 A | 7/1999 | Kowalski et al. | |
| 5,964,291 A | 10/1999 | Bourne et al. | |
| 6,025,302 A | 2/2000 | Pakulski | |
| 6,209,643 B1* | 4/2001 | Nguyen et al. | 166/276 |
| 6,209,646 B1 | 4/2001 | Reddy et al. | |
| 6,279,656 B1 | 8/2001 | Sinclair et al. | |
| 6,326,335 B1 | 12/2001 | Kowalski et al. | |
| 6,331,508 B1 | 12/2001 | Pakulski | |
| 6,380,136 B1 | 4/2002 | Bates et al. | |
| 6,439,310 B1 | 8/2002 | Scott, III et al. | |
| 6,527,051 B1 | 3/2003 | Reddy et al. | |
| 6,613,899 B1 | 9/2003 | Kuzzee et al. | |
| 6,723,683 B2 | 4/2004 | Crossman et al. | |
| 6,866,797 B1 | 3/2005 | Martin et al. | |
| 7,028,776 B2 | 4/2006 | Kirk | |
| 7,196,040 B2* | 3/2007 | Heath et al. | 507/219 |
| 7,270,184 B2 | 9/2007 | Kolter et al. | |
| 7,419,937 B2* | 9/2008 | Rimmer et al. | 507/90 |
| 7,491,682 B2 | 2/2009 | Gupta et al. | |
| 7,493,955 B2 | 2/2009 | Gupta et al. | |
| 7,494,711 B2 | 2/2009 | Kaufman et al. | |
| 7,598,209 B2 | 10/2009 | Kaufman et al. | |
| 2002/0128157 A1 | 9/2002 | Bates et al. | |
| 2004/0043906 A1 | 3/2004 | Heath et al. | |
| 2004/0060702 A1 | 4/2004 | Kotlar et al. | |
| 2004/0244969 A1 | 12/2004 | Kotlar et al. | |
| 2005/0028976 A1 | 2/2005 | Nguyen | |
| 2005/0034868 A1 | 2/2005 | Frost et al. | |
| 2005/0115710 A1 | 6/2005 | Kotlar et al. | |
| 2006/0065396 A1 | 3/2006 | Dawson et al. | |
| 2006/0091572 A1 | 5/2006 | Santra et al. | |
| 2006/0124301 A1 | 6/2006 | Gupta et al. | |
| 2007/0095528 A1* | 5/2007 | Ziauddin et al. | 166/252.3 |
| 2008/0035339 A1 | 2/2008 | Welton et al. | |
| 2008/0035340 A1 | 2/2008 | Welton et al. | |
| 2008/0058228 A1 | 3/2008 | Wilson | |
| 2009/0291861 A1 | 11/2009 | Sawdon | |
| 2009/0325825 A1 | 12/2009 | Gupta et al. | |
| 2010/0175875 A1 | 7/2010 | Becker et al. | |

FOREIGN PATENT DOCUMENTS

| | | |
|---|---|---|
| CA | 1262507 | 10/1989 |
| EP | 0540204 A2 | 5/1993 |
| GB | 2298440 | 9/1996 |
| WO | 99/36668 A1 | 7/1999 |
| WO | 99/54592 | 10/1999 |
| WO | 0011949 A1 | 3/2000 |
| WO | 0240827 A1 | 5/2002 |
| WO | 2005/017313 A1 | 2/2005 |
| WO | 2008032067 A1 | 3/2008 |

OTHER PUBLICATIONS

"Extrusion" retrieved Dec. 14, 2012 from http://en.wikipedia.org/wiki/Extrusion.*

P.J.C. Webb Aea Technology PLC, T.A., et al; Revolutionary New Chemical Delivery System for Fractured, Gravel Packed and Prepacked Screen Wells; SPE 38164; 1997.

P.J.C. Webb Aea Technology PLC, T.A., et al; Economic and Technical Advantages of Revolutionary New Delivery System for Fractured and Gravel Packed Wells; SPE 38548; 1997.

P.J.C. Webb Aea Technology PLC, T.A., et al; Economic and Technical Features of a Revolutionary Chemical Scale Inhibitor Delivery Method for Fractured and Gravel Packed Wells: Comparative Analysis of Onshore and Offshore Subsea Applications; SPE 39451; 1998.

(Continued)

*Primary Examiner* — Angela M DiTrani (74) *Attorney, Agent, or Firm* — John Wilson Jones; Jones & Smith, LLP (57) ABSTRACT

Shaped particulates which have been compressed from a composite of a well treatment agent and adsorbent in a matrix may be introduced into horizontal or deviated oil or gas wells. The well treatment agent of the shaped pellets may be used to prevent and/or control the formation of deposits in a production well.

25 Claims, 3 Drawing Sheets

(56) References Cited

OTHER PUBLICATIONS

Norris, et al; Maintaining Fracture Performance Through Active Scale Control; SPE 68300; 2001.

Norris, et al; Hydraulic Fracturing for Reservoir Management Production Enhancement, Scale Control and Asphaltine Prevention; SPE 71655; 2001.

McInnich, et al; New Relationship Between Oil Company and Service Company Rejuvenates a Mature North Sea Gas Field; SPE 78327; 2002.

Szymczak, et al; Long-Term Scale Inhibition Using a Solid Scale Inhibitor in a Fracture Fluid; SPE 102720; 2006.

Gupta, et al; Solid Production Chemicals Added With the Frac for Scale, Paraffin and Asphaltene Inhibition; SPE 119393; 2009.

Gupta, et al; Multi-Year Scale Inhibition from a Solid Inhibitor Applied during Stimulation; SPE 115655; 2008.

Smith, et al; Solid Paraffin Inhibitor Pumped in a Hydraulic Fracture Provides Long-Term Paraffin Inhibition in Permian Basin Wells; SPE 124868; 2009.

Pallanich; Slow-release medication relieves deepwater headache; Offshore Engineer; Aug. 2007.

Szymczak et al; Treat production problems before they occur; E&P; Jul. 2008.

D.M. Frigo et al; Chemical Inhibition of Halite Scaling in Topsides Equipment; SPE 60191; 2000.

\* cited by examiner

METHOD OF USING SHAPED COMPRESSED PELLETS IN TREATING A WELL

FIELD OF THE INVENTION

The invention relates to shaped compressed pellets formed from a composite of a well treatment agent in a matrix which are useful to inhibit and/or control the formation of unwanted deposits in a well.

BACKGROUND OF THE INVENTION

Oilfield fluids (e.g., oil, gas, and water) are generally complex mixtures of aliphatic hydrocarbons, aromatics, heteroatomic molecules, anionic and cationic salts, acids, sands, silts, clays and a vast array of other components. The nature of these fluids, combined with the severe conditions of heat, pressure, and turbulence to which they are often subjected, are contributing factors to the formation and deposition of unwanted contaminants, such as scales, salts, paraffins, corrosion, bacteria and asphaltenes in oil and/or gas production wells.

It is well known that unwanted deposits can precipitate from saturated oilfield waters in an oil or gas well leading to a restriction in the production piping and the potential plugging of the flow path including reservoir flow paths. For instance, common mineral scales such as calcium carbonate, calcium sulfate, or barium sulfate can precipitate from produced water and create blockages in flow paths, especially in production tubulars such as well tubing and flow lines. The formation and deposition of such unwanted contaminants decrease permeability of the subterranean formation, reduce well productivity, and, in some cases, may completely block the well tubing.

Treatments to remove deposits and inhibit the formation of unwanted deposits include the use of various mechanical preventative techniques such as scrapers or reamers and chemical treatment agents such as inhibitors, acids and converters. Mechanical tools typically deployed to remove deposits include wire lines and coil tubing. Such mechanical tools may further be used as a delivery means for chemical treatment agents into production tubing. These techniques are effective when the tubular is at an approximate 180° to the point of entry as gravity helps pull the treatment device into the well. In addition, there are limited restrictions on the tool if it is pulled out of the well when the tubular is at an approximate 180° to the point of entry. Wire lines and coil tubing have limited effectiveness, however, when the tubular being treated is deviated, as in a horizontal well or "S" shaped configuration. The flexibility of the wire and coil tubing make it difficult to push a long distance past a severe deviation or multiple deviations. Chemical prevention or remedial techniques can be effective if the treatment can be delivered reliably to the target location and in sufficient quantity to do its intended function.

Other methods exist for effective delivery of chemical treatment agents to unwanted deposits. For example, the technique of "downhole squeezing" is commonly used to address formation deposits, wherein a slug of the well treatment composition is injected into the annulus, using a pre-flush, squeeze, and over flush treatment before the well can be returned to normal function. This technique requires large volumes of treatment and flush fluid in horizontal wells with a large area of perforated interval. Further treatments are typically required as the chemical residual is depleted, once again requiring large volumes of flush and treatment into the well. Such treatment methods are typically inefficient in horizontal wells because it is difficult to ensure the treatment is delivered to all the intended area. The flush and chemical additive often required large pumps and holding tanks which can add significant costs to the application.

Solid chemical additives are sometimes delivered to wells in the form of a cylinder shape known in the industry as "sticks". The sticks are either a solid version of a chemical additive or a dissolvable shell filled with liquid chemical additive. This delivery type is effective in vertical wells but in deviated wells the shape of the cylinder and typical square ends prevent the solid treatment from being placed beyond a deviation.

Solid chemical additives in the form of a slurry are used in the industry. This type of treatment is effective in vertical wells but require a flush to aid in delivery to the bottom of the well. In a deviated well such as a horizontal well or well with multiple deviations such as an "S" shaped completion, it is important that the slurry mass not be too heavy in order for the flush to be carried past the deviation. If the density of the slurry is too high, the slurry will settle just beyond the deviation.

Capillary tubing lengths are frequently installed in wells to aid in delivery of a chemical treatment. This technique is effective in its intended function but is expensive and requires specialized equipment to install. Further, capillary tubing may not be able to extend to great depths if the deviation angle is severe or the piping extends far beyond the bend.

While solid additives have been added to the well during the completion stage, this technique has only been proven to be an effective delivery method in new wells when the opportunity to spot the chemical additive is available.

Alternative treatment methods have therefore been sought for introducing well treatment agents into producing oil and/or gas wells and especially where the well tubing is deviated or contains multiple deviations.

SUMMARY OF THE INVENTION

Shaped compressed pellets formed from a composite of a well treatment agent in a matrix may be used to slowly and continuously release the well treatment agent into a targeted area in a well.

A major advantage of the shaped pellets is that they typically do not require use of any specialized equipment. They are especially useful in the treatment of production wells where traditional mechanical means are unable to reach.

The shaped pellets may be dropped directly into the well from the well head. When introduced into production tubing within an oil or gas well, the shaped pellets easily flow past obstructions and through well deviations. Continuous release of the well treatment agent with the production fluid protects the tubular and the surface equipment from unwanted deposits which may be formed in the tubular or surface equipment. The high specific gravity of the shaped pellets allows them to pass by gravity into and through production tubing.

The shaped pellets are especially useful when introduced into horizontal or deviated wells since they easily pass through restrictions in the wellbore and flow into low points of the horizontal well or past obstruction in a deviated well.

When shaped as spheres, the pellets are able to readily roll over obstructions within the tubing and thru well deviations to effectively place the well treatment agent in close proximity to the targeted area. The spheres are especially useful in delivering well treatment agents in wells having deviations ranging from 45° to 89° or in wells with multiple deviations such as "S" shaped completions.

When formed to resemble hockey pucks, the shaped pellets may be placed into a receptacle and suspended at distant locations within the well. When the well treatment agent is depleted within the receptacle, the receptacle may then be pulled to the surface and reloaded with additional pellets.

Suitable well treatment agents include those capable of addressing the undesired effects caused by scale formations, salt formations, paraffin deposition, emulsification (both water-in-oil and oil-in-water), gas hydrate formation, corrosion, asphaltene precipitation and paraffin formation. Other suitable treatment agents include foaming agents, oxygen scavengers, biocides and surfactants may be used as the well treatment agent for slow release into the well.

BRIEF DESCRIPTION OF THE DRAWINGS

In order to more fully understand the drawings referred to in the detailed description of the present invention, a brief description of each drawing is presented, in which.

DETAILED DESCRIPTION OF THE PREFERRED EMBODIMENTS

The shaped compressed pellets defined herein are formed from a composite having a well treatment agent adsorbed onto a water-insoluble adsorbent. The composite may be those disclosed in U.S. Pat. Nos. 7,491,682 and 7,493,955, herein incorporated by reference. In addition, the compressed pellet may contain a weighting agent in order to increase the specific gravity of the pellet.

The well treatment agent is slowly released from the compressed pellet after being introduced into a targeted area in the well. The targeted area may be a site in the well where deposits have already formed or a location in the well where it is desirable for deposits not to form. The compressed pellets provide a continuous supply of the well treatment agent into the targeted area.

The pellets have particular applicability in areas within the well where conventional systems have been unable to reach.

Use of the shaped pellets renders unnecessary the use of burdensome mechanical tools and procedures. While the shaped compressed pellets may be used to treat any type of well that requires chemical treatment, they have particular applicability in the treatment of production wells where traditional mechanical means such as wire lines or coil tubing have been unable to reach. For instance, the shaped pellets may be introduced directly into production tubing by being dropped directly into the well head or may be placed in a receptacle and lowered into the well.

When introduced into production tubing within the well, the shape and specific gravity of the pellets causes the particulates to flow past obstructions and through well deviations such that the pellets may be placed at or in close proximity to the targeted area where treatment is desired. Continuous release of the well treatment agent with the production fluid further protects the tubular and the surface equipment from unwanted deposits which may otherwise be formed. Production from the well is thereby improved.

Similar performance has been seen in producing wells where the shaped pellets are used simply to deploy production chemicals, particularly in horizontal wells where capillary deployment is not possible to the toe of the horizontal section of the well or where squeeze treatments are impractical; for example, in wells which have not been stimulated.

The shaped pellets may be in the form of a sphere, cylinder, rod or any other shape which allows for the slow release of the well treatment agent into the targeted area. In some applications, the shaped pellets are cylindrically shaped having a length of about 0.5 inch to about 6 inches, preferably from about 1 inch to about 2 inches and a diameter of from about 0.25 inch to about 4 inches, preferably from about 0.5 inch to about 1 inch.

In those instances where the shaped pellet is to be directly dropped into the well from the well head, the pellet is preferably spherical and is formed into a ball-like sphere having a diameter between from about ½ inch to about 3 inches, more preferably from about ¾ inch to about 2½ A inches, most preferably approximately 1¾ inch. Such spheres resemble spherical balls.

The specific gravity of the shaped pellets is generally between from about 1.1 to about 3. In a preferred embodiment, the specific gravity of the sphere is between from about 2 to about 2.5.

Such specific gravity is especially desirable when the shaped pellets are spherical and where it is desired to drop the pellet directly into the well head. When used as one or more spherical balls, the pellets may be introduced into the well above the master valve at the wellhead. The isolation valve above the spherical ball(s) may then be closed and the master valve then opened. Gravitational forces will pull the ball(s) into the production tubing. The low specific gravity allows the sphere(s) to fall by gravitational forces through the production tubing. The combination of gravitational forces, specific gravity of the ball(s), sphericity of the ball(s) and size then allow the ball(s) to fall, sink or roll down the tubing and pass through restrictions in the wellbore. When introduced into a horizontal well, the spherical ball(s) will generally flow into the lowest point of the well. When introduced into a deviated well, the spherical pellets easily may flow past obstructions as they are pulled by gravity through the deviations in the well path where traditional mechanical means such as wire line or coil tubing may not be able to reach. The shaped pellets have applicability when used during completion of a well having multiple deviations such as those wells having an "S" shaped configuration.

Once the spherical ball(s) reach their targeted area, they will slowly dissolve, providing a residual of the well treatment agent in produced fluids. Thus, the slow dissolution of the ball(s) provides the means to inhibit and/or remove unwanted deposits in the tubing.

When dropped directly into the well head, it is often only necessary to use one spherical ball. Typically, no more than ten spherical balls need be used to effectuate the slow release of the well treatment agent. Slow dissolution of the spherical balls permits slow dissolution of the well treatment agent.

The shaped pellets further are useful in gas wells having a tubing pressure of from about 1 to about 10,000 psi. Exemplary of such wells are shale gas wells. Further the spherical particulates have applicability in unobstructed tubulars. For instance, the spherical pellets are useful in those wells where the hydrocarbons are no longer freely flowing, such as wells on bottom hole electric submersible pumps (ESP).

In another preferred embodiment of the invention, the shaped pellets may be simply lowered into the well. For instance, the particulates may be placed into a receptacle, such as a wire basket, and suspended at the bottom of the well by various means, such as by a wireline or by being hung to the bottom of a rod pump. When the particulates are depleted of the well treatment agent, the wire basket may then be pulled to the surface and reloaded with additional particulates for further treatment.

In a preferred embodiment, the well treatment agent may be at least one member selected from the group consisting of demulsifying agents (both water-in-oil or oil-in-water), corrosion inhibitors, scale inhibitors, paraffin inhibitors, gas hydrate inhibitors, salt formation inhibitors, asphaltene dispersants, foaming agents, oxygen scavengers, biocides and surfactants as well as other agents wherein slow release into the production well is desired.

The well treatment agent is preferably a liquid material. If the well treatment agent is a solid, it can be dissolved in a suitable solvent, thus making it a liquid.

Suitable scale inhibitors are those which are efficacious in the treatment of scales of calcium, barium, magnesium salts and the like, including barium sulfate, calcium sulfate, and calcium carbonate scales as well as inorganic scales, such as zinc sulfide, iron sulfide, etc.

Exemplary scale inhibitors are strong acidic materials such as a phosphonic acid, a phosphoric acid or a phosphorous acid, phosphate esters, phosphonate/phosphonic acids, the various aminopoly carboxylic acids, chelating agents, and polymeric inhibitors and salts thereof. Included are organo phosphonates, organo phosphates and phosphate esters as well as the corresponding acids and salts thereof. Phosphonate/phosphonic acid type scale inhibitors are often preferred in light of their effectiveness to control scales at relatively low concentration. Polymeric scale inhibitors, such as polyacrylamides, salts of acrylamido-methyl propane sulfonate/acrylic acid copolymer (AMPS/AA), phosphinated maleic copolymer (PHOS/MA) or sodium salt of polymaleic acid/acrylic acid/acrylamido-methyl propane sulfonate terpolymers (PMA/AMPS), are also effective scale inhibitors. Sodium salts are preferred. Further useful, especially for brines, are chelating agents, including diethylenetriaminepentamethylene phosphonic acid and ethylenediaminetetra acetic acid.

Further preferred as scale removal agents are inorganic and organic strong acids such as hydrochloric acid, acetic acid and formic acid. Caustic scale removal agents may be employed to remove sulfate scales and may include sodium hydroxide, chelants such as EDTA, glucoheptanate, and urea.

Exemplary of the demulsifying agents that are useful include, but are not limited to, condensation polymers of alkylene oxides and glycols, such as ethylene oxide and propylene oxide condensation polymers of di-propylene glycol as well as trimethylol propane; and alkyl substituted phenol formaldehyde resins, bis-phenyl diepoxides, and esters and diesters of the such di-functional products. Especially preferred as non-ionic demulsifiers are oxyalkylated phenol formaldehyde resins, oxyalkylated amines and polyamines, di-epoxidized oxyalkylated polyethers, etc. Suitable oil-in-water demulsifiers include poly triethanolamine methyl chloride quaternary, melamine acid colloid, aminomethylated polyacrylamide etc.

Paraffin inhibitors useful as the well treatment agent include, but are not limited to, ethylene/vinyl acetate copolymers, acrylates (such as polyacrylate esters and methacrylate esters of fatty alcohols), and olefin/maleic esters.

Exemplary corrosion inhibitors useful for the practice of the invention include but are not limited to fatty imidazolines, alkyl pyridines, alkyl pyridine quaternaries, fatty amine quaternaries and phosphate salts of fatty imidazolines.

Gas hydrate treating chemicals or inhibitors that are useful for the practice of the present invention include but are not limited to polymers and homopolymers and copolymers of vinyl pyrrolidone, vinyl caprolactam.

Exemplary asphaltene treating chemicals include but are not limited to fatty ester homopolymers and copolymers (such as fatty esters of acrylic and methacrylic acid polymers and copolymers) and sorbitan monooleate.

Suitable foaming agents include, but are not limited to, those which are amphoteric, anionic or cationic. Preferred anionic foaming agents include betaines, alkyl ether sulfates, oxyalkylated sulfates, alkoxylated alcohol sulfates, phosphate esters, alkyl ether phosphates, alkoxylated alcohol phosphate esters, alkyl sulfates as well as alpha olefin sulfonates. Included as amphoteric surfactants are glycinates, amphoacetates, propionates, betaines and mixtures thereof.

Exemplary surfactants include cationic, amphoteric, anionic and nonionic surfactants. Included as cationic surfactants are those containing a quaternary ammonium moiety (such as a linear quaternary amine, a benzyl quaternary amine or a quaternary ammonium halide), a quaternary sulfonium moiety or a quaternary phosphonium moiety or mixtures thereof. Suitable surfactants containing a quaternary group include quaternary ammonium halide or quaternary amine, such as quaternary ammonium chloride or a quaternary ammonium bromide. Included as amphoteric surfactants are glycinates, amphoacetates, propionates, betaines and mixtures thereof. The cationic or amphoteric surfactant may have a hydrophobic tail (which may be saturated or unsaturated) such as a $C_{12}$-$C_{18}$ carbon chain length. Further, the hydrophobic tail may be obtained from a natural oil from plants such as one or more of coconut oil, rapeseed oil and palm oil. Preferred surfactants include N,N,N trimethyl-1-octadecammonium chloride: N,N,N trimethyl-1-hexadecammonium chloride; and N,N,N trimethyl-1-soyaammonium chloride, and mixtures thereof. Suitable anionic surfactants are sulfonates (like sodium xylene sulfonate and sodium naphthalene sulfonate), phosphonates, ethoxysulfates and mixtures thereof.

Exemplary oxygen scavengers include triazines, maleimides, formaldehydes, amines, carboxamides, alkylcarboxylazo compounds cumine-peroxide compounds morpholino and amino derivatives morpholine and piperazine derivatives, amine oxides, alkanolamines, aliphatic and aromatic polyamines.

The water insoluble adsorbent may be any of various kinds of commercially available high surface area materials having the affinity to adsorb the desired well treatment agent. Typically, the surface area of the adsorbent of the well treating composite is between from about 1 $m^2$/g to about 100 $m^2$/g.

Suitable adsorbents include finely divided minerals, fibers, ground almond shells, ground walnut shells, and ground coconut shells. Further suitable water-insoluble adsorbents include activated carbon and/or coals, silica particulates, precipitated silicas, silica (quartz sand), alumina, silica-alumina such as silica gel, mica, silicate, e.g., orthosilicates or metasilicates, calcium silicate, sand (e.g., 20-40 mesh), bauxite, kaolin, talc, zirconia, boron and glass, including glass microspheres or beads, fly ash, zeolites, diatomaceous earth, ground walnut shells, fuller's earth and organic synthetic high molecular weight water-insoluble adsorbents. Particularly preferred are diatomaceous earth and ground walnut shells.

Further useful as adsorbents are clays such as natural clays, preferably those having a relatively large negatively charged surface, and a much smaller surface that is positively charged. Other examples of such high surface area materials include such clays as bentonite, illite, montmorillonite and synthetic clays.

The weight ratio of well treatment agent to water-insoluble adsorbent in the composite is generally between from about 90:10 to about 10:90. The amount of well treatment agent in the composite is that amount sufficient to effectuate the desired release into the flowing produced fluid over a sustained period of time. Generally, the amount of well treatment agent released is from about 0.05 to about 5 (preferably from about 0.1 to about 2) weight percent based upon the total weight of flowing produced fluid. In some instances, the amount of well treatment agent in the well produced fluid may be as low as 0.1 ppm. Such small amounts of well treatment agents in the produced fluid released from the composite forming the compressed pellet may be sufficient for up to 1,000 pore volumes and typically provides up to six months to twelve months of continuous inhibition of the unwanted deposit.

The binder, to which the composite is added, generally serves to hold the well treatment agent and any desired additives agents together during compression. Suitable binders may be an organic binder or inorganic binder. Typical organic binders are those selected from resole or novolac resins, such as phenolic resole or novolac resins, epoxy-modified novolac resins, epoxy resins, polyurethane resins, alkaline modified phenolic resoles curable with an ester, melamine resins, urea-aldehyde resins, urea-phenol-aldehyde resins, furans, synthetic rubbers, silanes, siloxanes, polyisocyanates, polyepoxys, polymethylmethacrylates, methyl celluloses, crosslink entangled polystyrene divinylbenzenes, and plastics of such polymers as polyesters, polyamides, polyimides, polyethylenes, polypropylenes, polystyrenes, polyolefins, polyvinyl alcohols, polyvinylacetates, silyl-modified polyamides and, optionally, a crosslinking agent. Typical inorganic binders include silicates, e.g., sodium silicate, aluminosilicates, phosphates, e.g., polyphosphate glass, borates, or mixtures thereof, e.g., silicate and phosphate.

The amount of binder added to the composite to form the compressed pellet is typically from about 0.5 to about 50, preferably from about 1 to about 5 percent based on the total weight of the binder and composite, prior to compression.

Prior to being shaped, a weighting agent may be combined with the composite and binder in order to impart to the shaped pellet a higher specific gravity. When present, the amount of weighting agent added to the composite is that amount needed to adjust the specific gravity of the shaped particulate to the requirements of the treated well. Suitable weighting agents include sand, glass, hematite, silica, sand, aluminosilicate, and an alkali metal salt or trimanganese tetraoxide.

The shaped particulates may be produced by procedures known in the art. Typically the shaped particulates are formed by combining the well treatment composite and, optional, weighting agent, with a binder and then compressing the mixture in a mold of the desired shape or extruding the mixture into its desired shape.

Exemplary of the process for making the shaped particulates is to combine the composite, prepared in accordance with the teachings set forth in U.S. Pat. Nos. 7,493,955 or 7,494,711, with an organic binder and then compressing the mixture at a temperature between from about 20° C. to about 50° C. at a pressure of from between 50 to about 5000 psi. The hardened particulates may then be screened to the desired size and shape. In another preferred embodiment, the shaped composites are produced by a continuous extrusion at a temperature between from about 400° C. to about and 800° C.

The shaped particulates may further be coated with a resin, plastic or sealant which is resistant to the hydrocarbons produced in the well. Suitable resins include phenolic resins like phenol formaldehyde resins, melamine formaldehyde resins, urethane resins, epoxy resins, polyamides, such as nylon, polyethylene, polystyrene, furan resins or a combination thereof.

The coating layer serves to strengthen the compressed pellet, protect the pellet from harsh environmental conditions, protect the pellet from rupturing as it is lowered into the well and to lengthen the time of release of the well treatment agent from the pellet. The coating layer may be applied to the pellet by mixing the pellet and coating material in a vessel at elevated temperatures, typically from about 200 to about 350, preferably around 250° F. An adherent, such as a resin adhesive or tackifying resin, may further be added to the vessel during mixing. The adherent may be used to assist the adhesion of the coating onto the compressed pellet. Alternatively, the coating layer may also be applied as a spray in a solvent based coating on the compressed pellet and then dried to remove the solvent.

The following examples are illustrative of some of the embodiments of the present invention. Other embodiments within the scope of the claims herein will be apparent to one skilled in the art from consideration of the description set forth herein. It is intended that the specification, together with the examples, be considered exemplary only, with the scope and spirit of the invention being indicated by the claims which follow.

EXAMPLES

All percentages set forth in the Examples are given in terms of weight units except as may otherwise be indicated.

Example 1

About 800 g of 10/50 mesh diatomaceous earth (Celite MP-79) absorbent was added into a mixing bowl. A paddle mixer blade was attached and liquid organophosphate (DEQUEST® 2000 phosphate, a product of Dequest AG) was added to the mixing bowl at a rate in which the liquid was readily absorbed, and the liquid did not puddle. After all of the liquid was added, mixing was continued until a homogenous blend was produced. The blend was then dried at 225 F until the percent moisture of the resulting product was less than 3%. The composite thus prepared contained 25 percent by weight of organophosphate scale inhibitor.

To the composite was then added a binder of an epoxy resin (A), phenolic resin (B) and polyvinyl alcohol (C). The mixture contained about 50 percent by weight of the resin. The mixture was then compressed under a pressure of about 250 psi for about 1 minute in a mold to render a cylindrical pellet resembling a hockey puck having a diameter of about 1 inch and a thickness of about 0.5 inch to render puck (A), (B) and (C) corresponding to the epoxy resin binder, phenolic resin binder and polyvinyl alcohol binder, respectively. Puck (D) was obtained by coating Puck (C) with an epoxy resin by spray and drying.

Example 2

Figure 1:
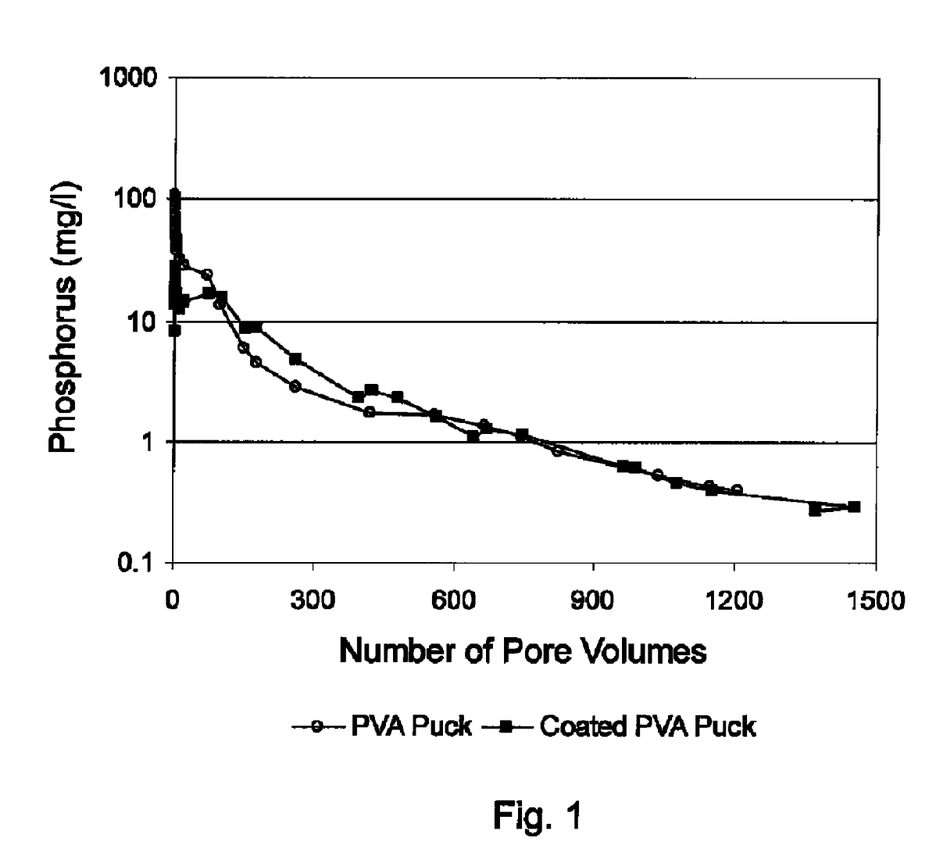
FIG. 1 illustrates the inhibitor return curve for a compressed pellet of a composite of scale inhibitor and adsorbent in a polyvinyl alcohol matrix [Puck (C)] and an epoxy matrix [Puck (D)].

The elution characteristics of Puck C and Puck D were then determined by packing approximately 440 grams 20/40 Ottawa white frac sand and 3 pieces of the pucks into a 30 cm length stainless steel column (ID=3.48 cm). The pore volume of the column was approximately 80 milliliters. The column was eluted with a synthetic brine (0.025 mol/L $CaCl_2$, 0.015 mol/L $NaHCO_3$, 1 mol/L NaCl, sparged with 100% $CO_2$) at 60° C. at a flow rate of 270 ml/hour. The effluent solution was collected and analyzed for phosphorus and calcium concentration to obtain the inhibitor flow back curve, set forth in FIG. 1. As illustrated in FIG. 1, the concentration of phosphorus in the effluent gradually decreased as synthetic brine was pumped into the column. After 1200 pore volumes of return flow, the concentration of effluent phosphorus remained approximately 0.4 ppm. There was no significant difference found between the phosphorus return curves of Puck (C) and Puck (D). The data demonstrates the ease that the pucks have while flowing through production tubing.

Example 3

Figure 2:
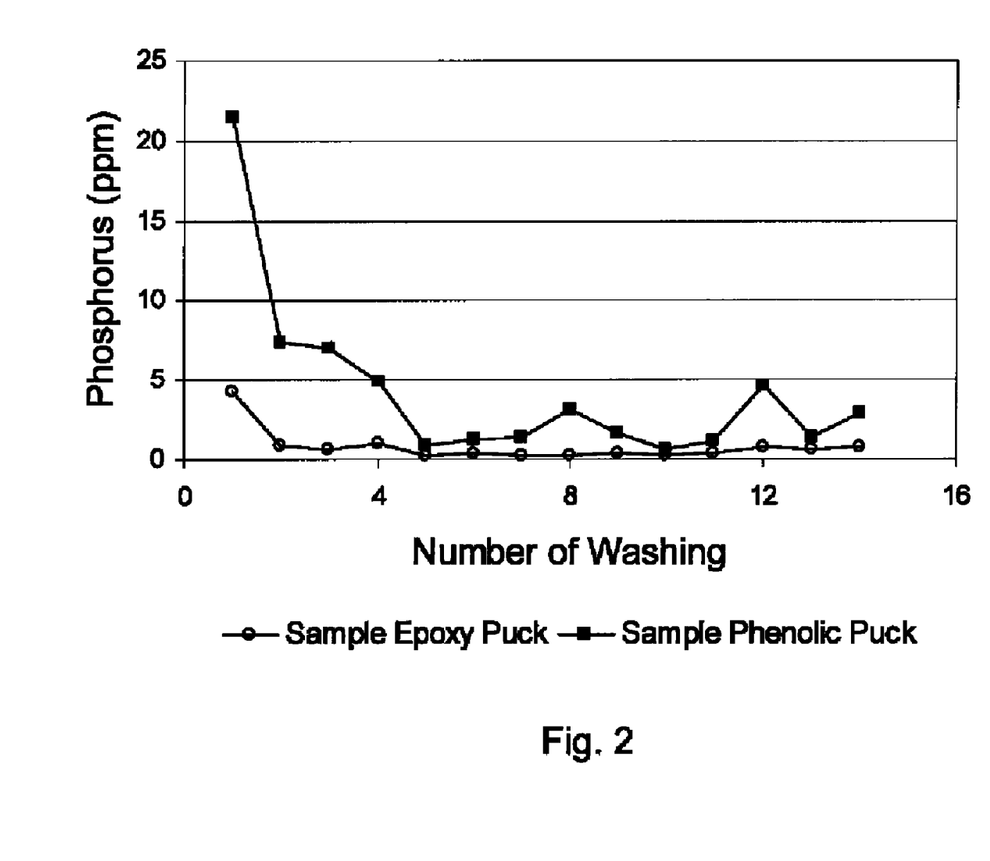
FIG. 2 illustrates the results of static breaker tests on a compressed pellet of a composite of scale inhibitor and adsorbent in an epoxy matrix [Puck (A)] and phenolic matrix [Puck (B)].

Puck (A) and Puck (B) were mixed with 500 ml of water. After 30 minutes, the supernatant was removed and the concentration of phosphorus in the supernatant was measured by (ICP) spectrophotometer. The test was repeated 14 times. The amount of residual phosphorous in the supernatant, illustrated as the static breaker test, is illustrated in FIG. 2. FIG. 2 demonstrates that the concentration of phosphorus in the effluent concentration of Puck (B) was higher than that of sample Puck (A) after washing with tap water.

Example 4

Figure 3:
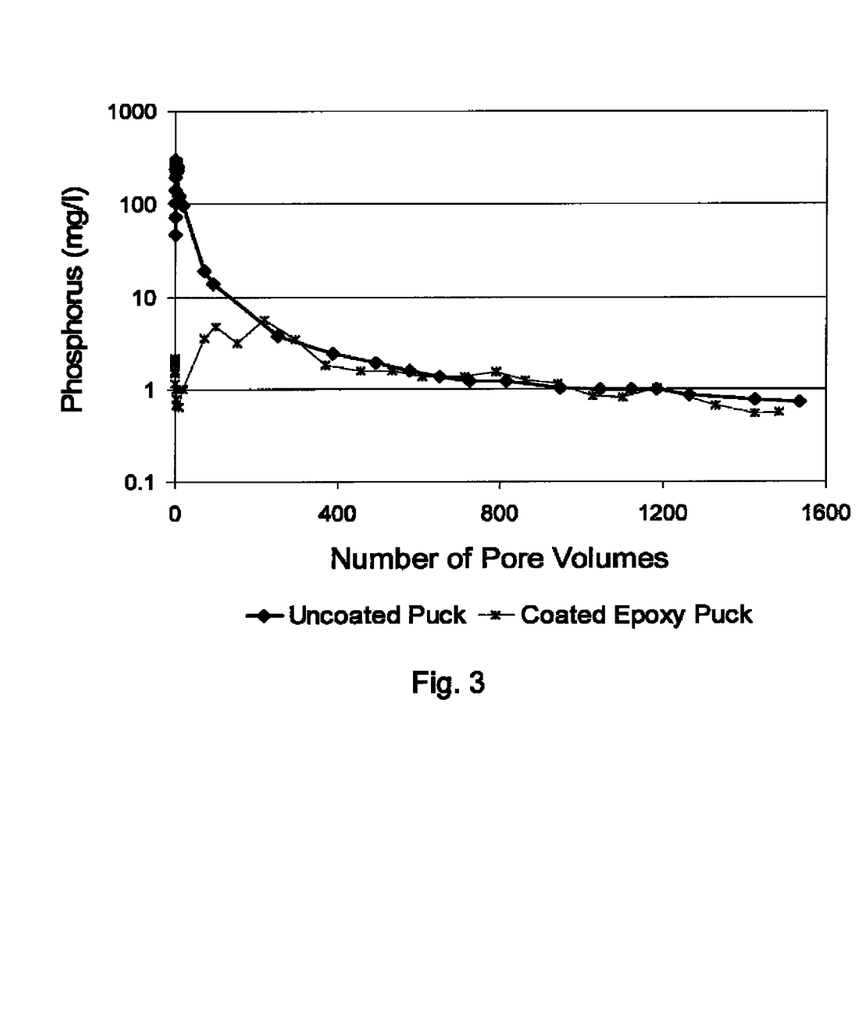
FIG. 3 illustrates the inhibitor return curve for a compressed pellet of a composite of scale inhibitor and adsorbent in a high melting polyethylene wax wherein only one of the pucks is coated with an epoxy resin.

To about 95% by weight of the composite of Example 1 was added about 5% by weight of a high melting polyethylene wax. The mixture was then compressed into a pellet having a diameter of 1 inch and about half inch in height to obtain Puck (E). Puck (F) was obtained by coating the compressed pellet of Puck (E) with about 20 weight % epoxy resin and drying the coated resin at 120° F. Puck(E) and Puck (F) were then immersed in water at 180° F. for five days. No deterioration was seen in either puck after 5 days. Puck (E) and Puck (F) were also immersed in W. Texas Crude Oil for two weeks at 140° F. No deterioration was seen in either puck after two weeks. Elution studies were then conducted on Puck (E) and Puck (F) in accordance with the testing conditions of Example 2. FIG. 3 represents the inhibitor flow back curve of Puck (E) and Puck (F). The results indicate the release of scale inhibitor above the minimum effective inhibitor concentration of 0.1 mg/l even after 1500 pore volumes of fluid elution through the column when the testing was terminated. The results of the release curve for the coated Puck (F) indicate no premature release of the inhibitor at the beginning which should result in longer effectiveness of the puck.

From the foregoing, it will be observed that numerous variations and modifications may be effected without departing from the true spirit and scope of the novel concepts of the invention.

What is claimed is:

1. A method of inhibiting or controlling the rate of release of a well treatment agent in a well during production of fluids from the well, the method comprising:
    (a) introducing into the well a shaped pellet produced by compressing a mixture into a desired shape, the mixture comprising a (i) binder and (ii) a composite of a well treatment agent adsorbed onto a water-insoluble adsorbent wherein the surface area of the adsorbent of the well treating composite is between from about 1 $m^2/g$ to about 100 $m^2/g$ and wherein the binder holds the composite together during compression of the mixture; and
    (b) releasing the adsorbed well treatment agent from the composite into produced fluids within the well.

2. The method of claim 1, wherein the amount of well treatment agent released from the composite into the well is from about 0.05 to about 5 weight percent based on the total weight of produced fluid.

3. The method of claim 2, wherein the shaped pellet is spherical.

4. The method of claim 3, wherein the shaped pellet is directly dropped into the well from the well head.

5. The method of claim 4, wherein the shaped pellet is directly dropped into the production tubing within the well.

6. The method of claim 4, wherein the shaped pellet is spherical and has a diameter between from about ½ inch to about 3 inches.

7. The method of claim 2, wherein the amount of well treatment agent released from the composite into the well is between from about 0.1 to about 2 weight percent based on the total weight of produced fluid.

8. The method of claim 1, wherein the specific gravity of the shaped pellet is between from about 1.1 to about 3.

9. The method of claim 1, wherein the well is a horizontal or deviated well.

10. The method of claim 9, wherein the well is a deviated well and wherein the deviations in the well are between from 45° to about 89° or wherein the deviations in the well are S-shaped.

11. The method of claim 1, wherein the shaped pellet further contains a weighting agent.

12. The method of claim 1, wherein the pellet is coated with a resin.

13. The method of claim 1, wherein the shaped pellet is introduced into the well in a receptacle and further wherein the receptacle is suspended in the well to a targeted area.

14. The method of claim 13, wherein the shaped pellet is cylindrically shaped.

15. The method of claim 13, wherein the receptacle is a wire basket.

16. The method of claim 13, wherein the receptacle is suspended at the bottom of the well by a wireline.

17. The method of claim 13, wherein the receptacle is hung to the bottom of a rod pump.

18. The method of claim 1, wherein the well treatment agent is selected from the group consisting of corrosion inhibitors, scale inhibitors, paraffin inhibitors, gas hydrate inhibitors, salt formation inhibitors, asphaltene dispersants, foaming agents, oxygen scavengers, biocides and surfactants.

19. The method of claim 18, wherein the well treatment agent is a scale inhibitor.

20. The method of claim 1, wherein the adsorbent is diatomaceous earth.

21. The method of claim 1, wherein the binder is an epoxy resin or a phenolic resin.

22. A method of inhibiting or controlling the formation of unwanted deposits in a deviated well by:
    (a) introducing into tubing within the well a shaped pellet produced by compressing a mixture into a desired shape, the mixture comprising a binder and a composite of a well treatment agent adsorbed onto a water-insoluble adsorbent wherein the surface area of the adsorbent is between from about 1 $m^2/g$ to about 100 $m^2/g$ and further wherein the binder holds the composite together during compression of the mixture;
    (b) flowing the shaped pellet over obstructions within the tubing and deviations in the well into a targeted area in the well where deposits are undesired and where hydrocarbons within the well are unable to flow; and
    (c) continuously releasing from the shaped pellet the well treatment agent in the targeted area.

23. The method of claim 22, wherein the adsorbent is diatomaceous earth.

24. A method of inhibiting or controlling the formation of unwanted deposits in a producing well by:
(a) introducing into tubing within the well a receptacle containing a spherical pellet of a mixture of (i) a binder and (ii) a composite of a well treatment agent adsorbed onto a water-insoluble adsorbent wherein the surface area of the adsorbent is between from about 1 $m^2/g$ to about 100 $m^2/g$, the spherical pellet having been prepared by compressing the mixture into a sphere wherein, during compressing the binder holds the composite together;
(b) lowering the receptacle to a targeted area in the well where deposits are undesired; and
(c) continuously releasing from the adsorbent the well treatment agent in the targeted area, wherein the amount of well treatment agent released from the adsorbent into the well is from about 0.05 to about 5 weight percent based on the total weight of produced fluid.

25. The method of claim 24, wherein the adsorbent is diatomaceous earth.

\* \* \* \* \*